United States Patent [19]
Stedman

[11] 4,166,511
[45] Sep. 4, 1979

[54] FOUR-TRACK LOW GROUND PRESSURE CRAWLER VEHICLE

[75] Inventor: Robert N. Stedman, Chillicothe, Ill.

[73] Assignee: Caterpillar Tractor Co., Peoria, Ill.

[21] Appl. No.: 810,548

[22] Filed: Jun. 27, 1977

[51] Int. Cl.² .............................................. B62D 55/06
[52] U.S. Cl. ..................................................... 180/9.5
[58] Field of Search ................... 180/9.5, 9.2 R, 9.32, 180/9.46

[56] References Cited
U.S. PATENT DOCUMENTS

| 1,804,816 | 5/1931 | Shelton | 180/9.5 |
| 3,177,961 | 4/1965 | Potter | 180/9.5 |
| 3,455,405 | 7/1969 | Parent | 180/9.5 |

*Primary Examiner*—Richard A. Bertsch
*Attorney, Agent, or Firm*—Phillips, Moore, Weissenberger, Lempio & Majestic

[57] ABSTRACT

A crawler vehicle rides on four spaced-apart crawler track assemblies which extend lengthwise beneath the vehicle body. Ground pressure is reduced and traction, flotation and stability are enhanced by a suspension system which enables the forward portion of each track assembly to rise and fall independently of the others to accommodate to irregular terrain. For similar purposes, the suspension system enables the outer and inner track assemblies below the right portion of the vehicle to oscillate outward and inward as a unit about an axis extending lengthwise of the vehicle while enabling the outer and inner track assemblies below the left side of the vehicle to oscillate as a unit in a similar but independent manner.

12 Claims, 13 Drawing Figures

Fig_6_

Fig_7_

Fig_8_

FOUR-TRACK LOW GROUND PRESSURE CRAWLER VEHICLE

BACKGROUND OF THE INVENTION

This invention relates to vehicles which ride on crawler tracks and more particularly to vehicles of this type which have more than the customary two track assemblies in order to enhance operational performance.

Crawler vehicles exhibit markedly superior performance characteristics in certain specific respects in comparison with wheeled vehicles. Crawler vehicles tend to be heavier and more complex and less adaptable to high-speed travel on a firm, level roadbed, but these factors are offset in many circumstances by the reduced ground pressure per unit area and the greater flotation, traction and stability on uneven or soft terrain which are provided by tracks as opposed to wheels. Consequently, crawler tracks are extensively used on certain forms of tractors, earth-moving equipment and on various other types of off-highway vehicle.

Most crawler vehicles are equipped with a single pair of crawler track assemblies, each one of the pair extending lengthwise of the vehicle body at an opposite side of the vehicle. Resilient suspensions may be provided which allow a very limited degree of independent oscillation of the two track assemblies to accommodate to terrain irregularities and to reduce road shocks. Most commonly both track assemblies are pivoted at the back to the vehicle body or frame to enable the forward portions to rise and fall independently of each other to a very limited extent as determined by suspension elements and stops near the front of the vehicle.

Much of the operational advantages of crawler tracks arise directly or indirectly from the relatively large ground contact area of such mechanisms. Thus it might appear at first consideration that the above-discussed advantages of crawler tracks in general could be enhanced by simply enlarging the conventional two track assemblies to provide increased ground contact area. In practice, a simple enlargement of the conventional two tracks may not produce the desired results except possibly in the unusual case of a vehicle designed to travel only in a straight line on perfectly flat terrain. If the underlying terrain is uneven and if different portions of the undersurface of the tracks are incapable of sizable independent vertical and angular movements, then at any given time the actual area of the tracks which is in contact with the ground may be much less than the total area of the underside of the track assemblies. Under such circumstances the objective of reduced ground pressure per unit area, greater flotation and traction are not realized and may even be adversely affected. A simple enlargement of the conventional two tracks may also aggravate problems, such as slippage, in connection with turning of the vehicle.

Because of the foregoing problems, it has heretofore been proposed to increase the area of crawler track in contact with the ground by employing more than two track assemblies below the vehicle rather than by simply enlarging the conventional two track assemblies. As heretofore designed, these multi-track assembly vehicles have tended to be structurally complex while not fully realizing the advantages of an extended ground contact area because of a limited ability to adjust to irregularities in the underlying terrain. Where the several track assemblies are unable to oscillate a sizable distance in the vertical direction relative to each other and are unable to assume different angular orientations about longitudinal axes through the vehicle, the mechanism still tends to experience the above-discussed problems on irregular terrain. That is, at any given time only limited portions of the total underside area of the track assemblies may be in effective contact with the ground. In addition, the actual contact areas may shift about randomly because of variations in the contour of the terrain.

SUMMARY OF THE INVENTION

The present invention is directed to overcoming one or more of the problems as set forth above.

According to the present invention, four spaced-apart crawler track assemblies extend lengthwise beneath a crawler vehicle and are coupled to the body of the vehicle through a suspension system which acts to maintain an extensive and balanced ground-contact area in the presence of terrain irregularities.

In the preferred form, the suspension system enables each of the four track assemblies to oscillate vertically independently of the other track assemblies and further enables the pair of track assemblies below the right side of the vehicle to swing outward and inwardly as a unit while allowing the pair of track assemblies below the left side of the vehicle to oscillate laterally as a unit in a similar but independent manner.

By maintaining an extensive ground-contact area at the four track assemblies in the presence of a variety of different types of terrain irregularity, a low unit ground pressure is realized and traction, flotation and stability are greatly enhanced.

The invention, together with further objects and advantages thereof will best be understood by reference to the following description of a preferred embodiment taken in conjunction with the accompanying drawings.

DESCRIPTION OF A PREFERRED EMBODIMENT

Figures 1, 3:
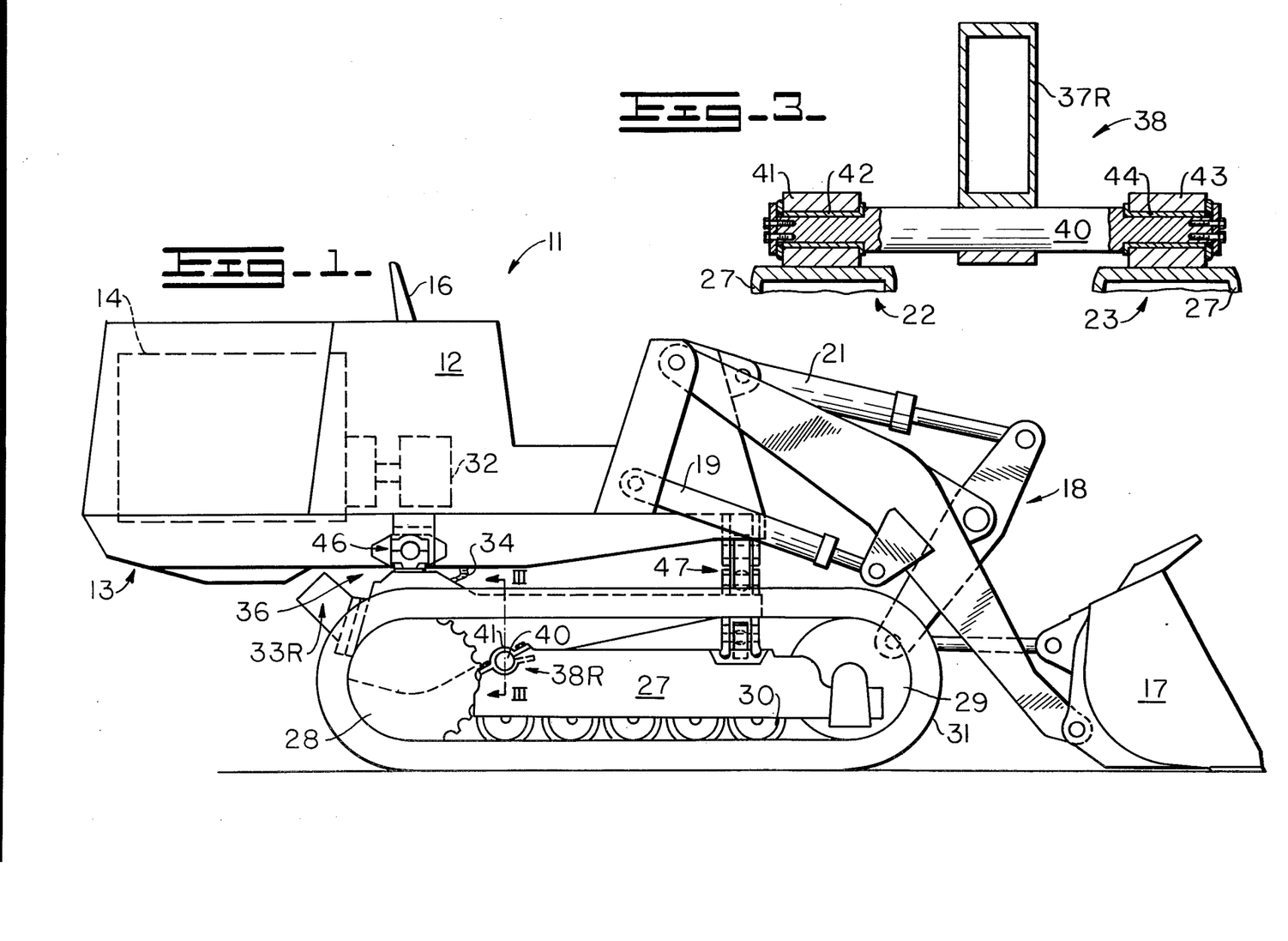
FIG. 1 is a side elevation view of a crawler vehicle embodying the invention.
FIG. 3 is a cross-section view taken along line III-III of FIG. 1 further illustrating components of the suspension system which couple the track assemblies to the vehicle body.

Referring initially to FIG. 1 of the drawing, there is shown a crawler vehicle 11 embodying the invention. In this example, the crawler vehicle 11 is a loader of the type used in earthmoving operations or for the handling of other bulk materials.

A loader vehicle 11 of this kind may typically have a body 12 carried on a main frame 13 which also supports an engine 14 and an operator's station 16. A materials-receiving bucket 17 is situated at the forward end of the vehicle and is coupled to body 12 through linkage 18 which includes hydraulic cylinders 19 and 21 for raising and lowering the bucket and for tilting the bucket about a horizontal transverse axis. The above-mentioned components of the vehicle 11 such as the body 12, engine 14, bucket 17, linkage 18 and the like may be of the known constructions and accordingly will not be described in detail. It should be understood that the depiction of the present invention within the context of a loader is for purposes of example only, the invention also being adaptable to other forms of crawler vehicle.

Figure 2:
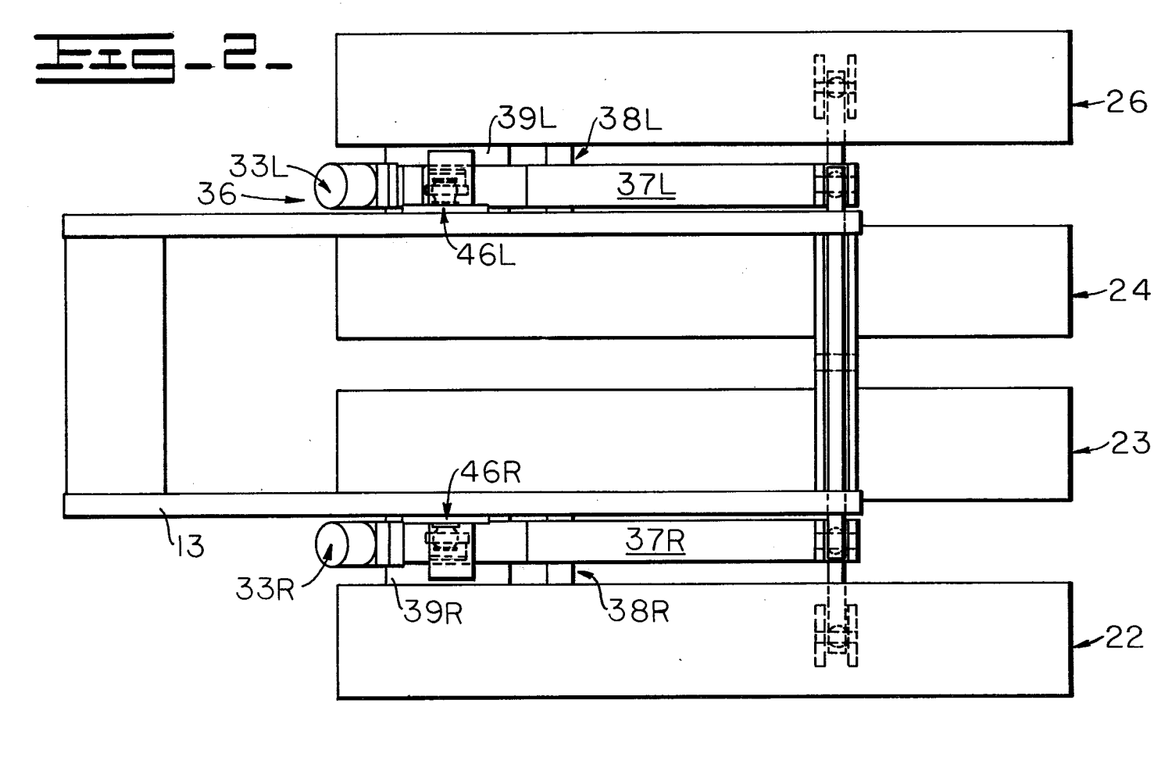
FIG. 2 is a plan view of the track assemblies, suspension and main frame of the vehicle of FIG. 1, the vehicle body and other components being absent in order to better illustrate novel aspects of the invention.

Referring now to FIGS. 1 and 2 in conjunction, the vehicle body 12 and main frame 13 are supported by and ride upon four separate crawler track assemblies 22, 23, 24 and 26 which are spaced apart and each of which extends lengthwise below the vehicle body. Track assemblies 22 and 23 constitute a right side pair situated below the right side of the vehicle body with track assembly 22 being outermost and track assembly 23 being innermost. The other two track assemblies 26 and 24 constitute a left side pair of track assemblies situated below the left half of the vehicle body with track assembly 26 being the outer one and track assembly 24 being the inner one of the pair.

Each such crawler track assembly 22 to 26 may be of conventional construction except as hereinafter described. Thus, as best seen in FIG. 1, each such crawler track assembly may have as salient elements a roller frame 27, a drive sprocket 28 at the back end and an idler 29 at the forward end. An endless crawler track chain 31 is engaged on idler 29 and drive sprocket 28 and is driven by rotation of the drive sprocket. A series of track rollers 30 are journaled along the lower portion of roller frame 27 and ride on the inner surface of the track chain 31 to distribute the weight of the vehicle along the track. Drive sprocket 28 of each track assembly may be driven from engine 14 through any suitable drive train except that if a wholly mechanical drive train is employed, the final drive connections to the track assemblies must be of a form which accommodates to the movements of the track assemblies relative to the vehicle body to be hereinafter described. To avoid this mechanical complication, the present example utilizes a hydrostatic or fluid form of drive of known form. In a hydrostatic drive, the vehicle engine 14 drives a fluid pump 32 which supplies pressurized fluid to two fluid motors 33R and 33L each of which is coupled to the drive sprockets 28S of two of the assemblies to turn the drive sprockets, the supporting and connecting means for the motors being hereinafter discussed in more detail. A fluid drive system of this form enables power to be transmitted from the body of the vehicle to the four track assemblies through flexible hoses 34 which accommodate to independent movements of the track system relative to the vehicle body. Suitable detailed constructions for a hydrostatic drive system of this kind are known to the art.

Referring again to FIGS. 1 and 2 in conjunction, the suspension system 36 through which the four track assemblies support the main frame 13 and the body 12 of the vehicle includes right and left suspension frame members 37R and 37L respectively. Right suspension frame 37R extends lengthwise of the vehicle between the right pair of track assemblies 22 and 23 while left suspension frame 37L is similarly positioned with respect to the left pair of track assemblies 24 and 26. Both of the right side track assemblies 22 and 23 are coupled to the right suspension frame member 37R through coupling means 38R which may be situated about midway between the back and the middle of the track assemblies and which allow the more forward portions of the track assemblies 22 and 23 to oscillate about an axis transverse to the vehicle and to do so independently of each other. Thus, the forward portion of either of the track assemblies 22 and 23 may rise or fall independently of the other by pivoting movement about the axis of coupling means 38R. The back portions of the right side track assemblies 22 and 23 do not oscillate relative to each other in this manner as the drive sprocket 28 of each such track assembly is coupled to the back end of right suspension frame member 37R through final drive housings 39R which enable drive to be transmitted to each sprocket from the right side hydraulic motor 33R which is mounted on the back end of right suspension frame member 37R.

Referring now to FIGS. 2 and 3 in conjunction, the coupling means 38R may include a shaft 40 extending laterally from each side of right suspension frame member 37R. The roller frame 27 of the outer right track assembly 22 is coupled to the outwardly extending end of shaft 40 through a bracket 41 and bearing 42 while the corresponding roller frame 27 of the inner right track assembly 23 is pivotably coupled to the inwardly extending end of shaft 40 through a similar bracket 43 and bearing 44. Thus the forward and central portions of each of the right side track assemblies 22 and 23 may oscillate about the transverse axis defined by shaft 40 and may do so independently of each other and independently of any of the other track assemblies.

As best seen in FIG. 2 in particular, the left side track assemblies 24 and 26 are similarly coupled to the left suspension frame member 37L through coupling means 38L which may be similar to the right coupling means 38R as described above and which is aligned along the same transverse axis.

Figure 4:
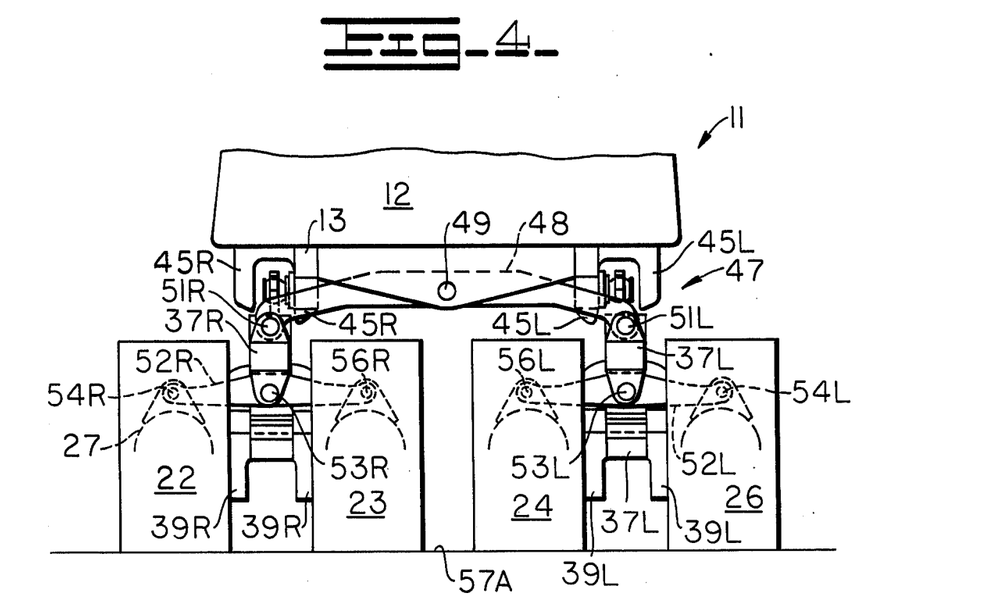
FIGS. 4 through 8 are front elevation views of the lower portion of the vehicle of the preceding figures, with certain accessory implements removed, illustrating the operation of the track and suspension system in traversing terrain having a variety of different contours.

The back portions of the two suspension frame members 37R and 37L are in turn coupled to main frame 13 by further means which enable still other forms of pivoting of oscillatory movement of the track assemblies. In particular, a back portion of each suspension frame member 37 extends upwardly and is coupled to the vehicle frame 13 through an associated individual one of a pair of trunnion or ball-and-socket joints 46R and 46L of the form which enable the members 37 to pivot up and down about a transverse axis and which also enable each member 37 to swing laterally outward or inward relative to the vehicle main frame 13. As the right side track assemblies 22 and 23 are jointly coupled to suspension frame member 37R through the previously described coupling means 38R, track assemblies 22 and 23 may swing outwardly and inwardly about trunnion bearing 46R as a unit and may also jointly oscillate up and down as a unit. Similarly, the left side track assemblies 24 and 26 swing outwardly and inwardly about trunnion bearing 46L as a unit and may jointly oscillate in the vertical direction. As best seen in FIG. 4, a right side pair of stops 45R and a left side pair of stops 45L may be secured to the right and left sides respectively of main frame 13, adjacent trunnion bearings 46R and 46L, to establish predetermined limits to the lateral swinging movement of the track assemblies.

Referring again to FIGS. 1 and 2 the portion of the suspension system 36 described above serves to couple the track assemblies 22, 23, 24, 26 to the main frame 13 and vehicle body at the back portions of the track assemblies. In order to support the vehicle body on the track assemblies, the suspension system must also include front coupling means 47 and such means must be able to accommodate to the independent and semiindependent motions of the track assemblies described above. In particular, the front coupling means 47 must enable the forward portions of the right side track assemblies 22 and 23 to rise and fall relative to the vehicle body both in synchronism with each other or independently of each other with either form of rising and falling motion being independent of the left side track assemblies 24 and 25. Similarly, the coupling means 47 must enable the forward portions of the left side track assemblies 26 and 24 to undergo similar joint or independent vertical motions relative to the vehicle body and relative to the right side track assemblies. Still further, the front coupling means 47 must accommodate to joint swinging motion of the right side track assemblies 22 and 23 laterally outward and inward and to similar but independent motion of the left pair of track assemblies 24 and 26.

Considering now suitable structure for the front coupling means 47 to realize these objectives, a primary doubletree member 48 extends transversely below the vehicle body 14 and is coupled to the forward end of main frame 13 by a pivot joint 49 which is situated midway between the sides of the main frame and which enables pivoting of the doubletree member 48 relative to the main frame and vehicle body about a longitudinal pivot axis situated midway between the sides of the vehicle. The term doubletree is herein used to designate certain members of the front coupling means 47 because there are some resemblances between the coupling means and the doubletree or whiffletree hitches used to couple a plurality of draft animals to an animal-drawn wagon.

The right end of doubletree member 48 is coupled to the forward end of right suspension frame member 37R by another pivot joint 51R while the left end of member 48 is similarly coupled to the forward end of the left suspension frame member 37L by a similar pivot joint 51L. Pivot joints 51R and 51L each have rotational axes extending lengthwise of the vehicle.

The forward end of the right suspension frame member 37R is in turn coupled to a forward portion of the roller frame 27 of each of the right side track assemblies 22 and 23 by a right secondary doubletree member 52R. The center portion of secondary doubletree member 52R is coupled to the forward end of suspension frame member 27R through a pivot joint 53R situated below pivot joint 51R and having a parallel axis of rotation. The outer end of secondary doubletree member 52R is coupled to the roller frame 27 of the outer right side track assembly 22 through a pivot joint 54R while the inner end of the same member 52R is coupled to the roller frame 27 of the inner right side track assembly 23 through still another pivot joint 56R, the rotational axes of joints 54R and 56R being parallel to those of the other joints 53R, 51R and 49 of the front coupling means 47.

The forward portions of the roller frames 27 of the left side track assemblies 24 and 26 are similarly coupled to the forward end of the left side suspension frame member 37L through a left secondary doubletree member 52L and pivot joints 53L, 54L and 56L which are similar to the corresponding components of the right side of the front coupling means 47 as described above.

In operation, the suspension system acts to maintain low ground pressure per unit area with high flotation and traction and acts to reduce tilting and rocking motions of the vehicle body 14 while traveling over terrain having a variety of irregularities. FIG. 4 depicts the vehicle traveling on a flat, hard surface 57A. FIGS. 5 to 8 illustrate how the several track assemblies and components of the suspension system shift to accommodate to different forms of terrain irregularity while continuing to maintain an extensive area of ground contact.

Figure 5:
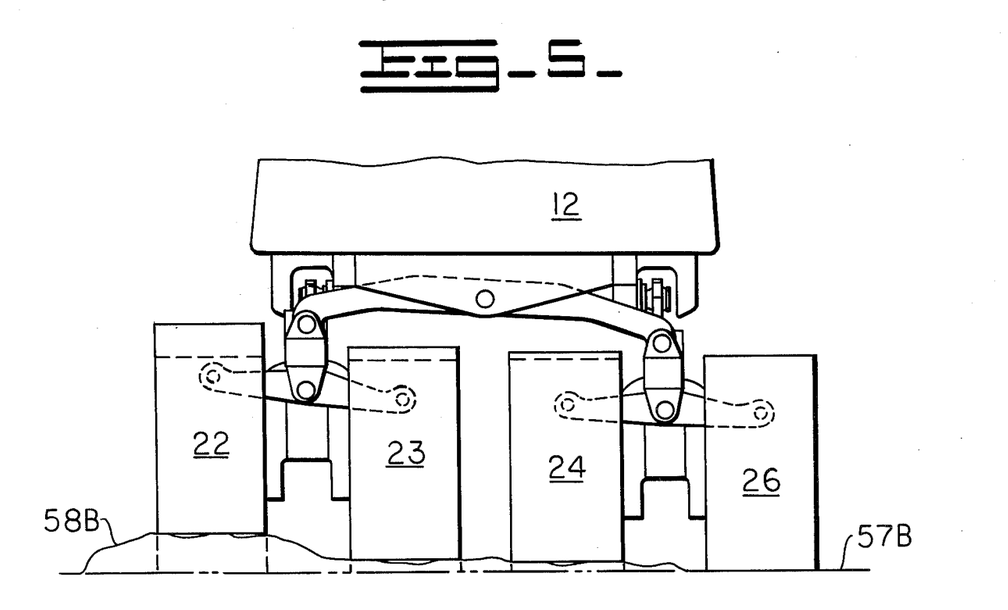

For example, as shown in FIG. 5 in particular, if the vehicle encounters a surface 57B having an irregular mound 58B of earth or other material which steps upward from one side of the vehicle to the other, then the forward portions of the track assemblies rise independently of each other as necessary to override the mound with each track assembly maintaining ground contact. Given the terrain configuration depicted in FIG. 5, track assembly 26 does not oscillate as it is traveling on the basic flat surface 57B. The forward portions of both track assemblies 24 and 23 rise slightly to override an intermediate step of the mound while the forward portion of the remaining track assembly 22 tilts upward a considerably greater amount to ride over a higher portion of the mound. The forward portion of each track of the upwardly tilted track assemblies 22, 23 and 24 then drop after passing over the mound 58B with the downward tilting motion of each being independent of that of the others if the contour of the mound 56B so dictates.

Figure 6:
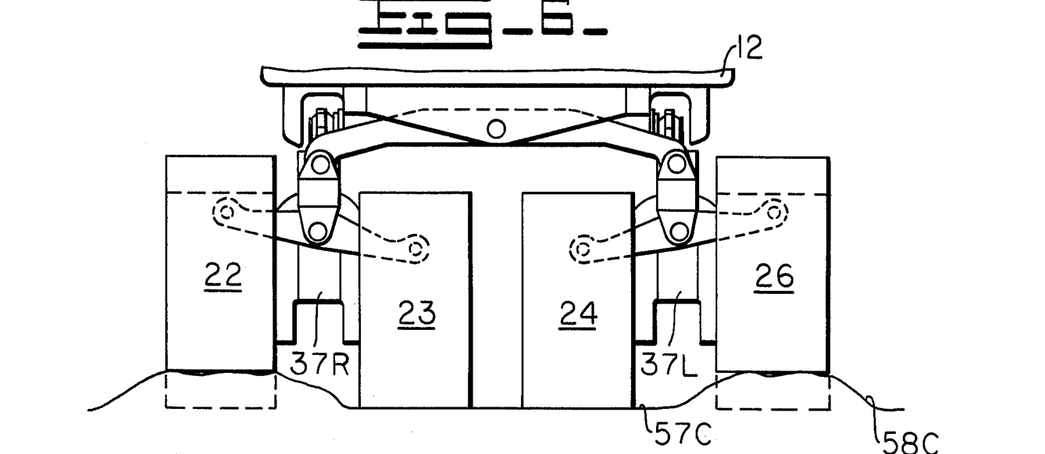

FIG. 6 illustrates the vehicle traveling along an irregular surface 57C in which the outermost track assemblies 22 and 26 are oscillating up to ride over spaced apart raised areas while the two innermost track assemblies 23 and 24 ride along the intervening gully 57C of lower elevation. It should be observed that when the back portions of the outer track assemblies reach the mounds 58C and rise to override the mounds, the forward portions of the two innermost track assemblies 23 and 24 may pivot downwardly relative to the suspension members with the result that at least portions of all four track assemblies continue to remain in contact with the underlying surface.

Figure 7:
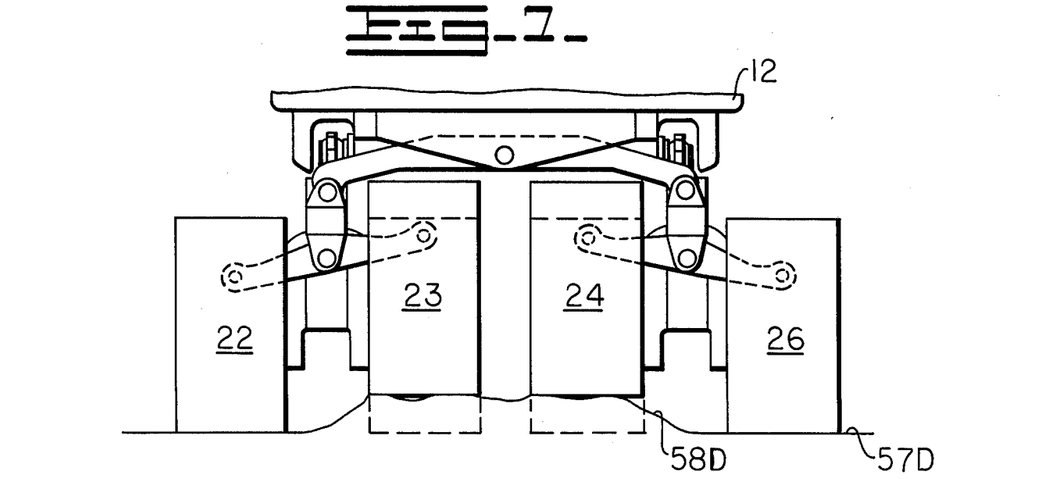

FIG. 7 illustrates the vehicle traveling over a ground surface 57C having a mound 58D over which only the two inner track assemblies must pass. In FIG. 7, the forward portions of the two outermost track assemblies 22 and 26 ride against the flat surface while the two innermost track assemblies 23 and 24 rise to override the intervening mound 58D.

Figure 8:
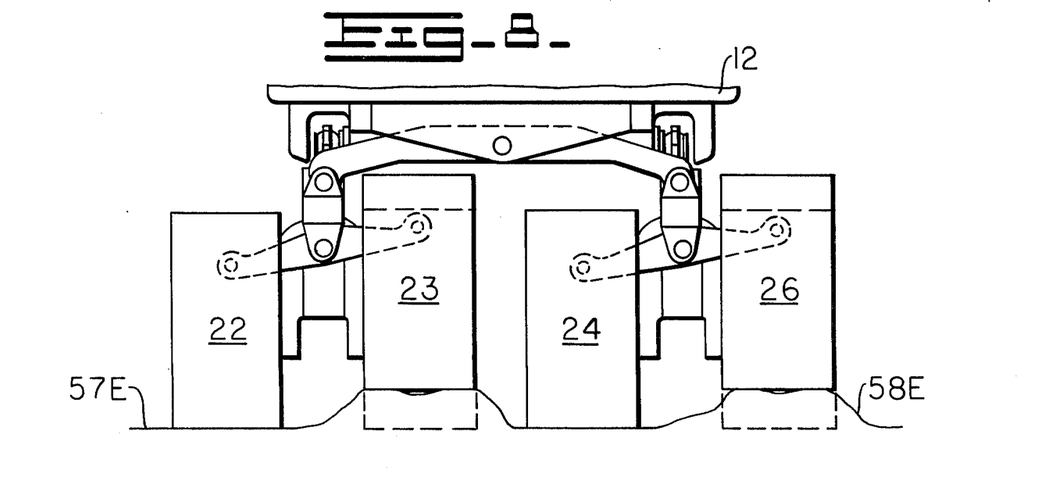

FIG. 8 illustrates the action of the track assemblies and suspension system on hummocky terrain under conditions where the outer right side track assembly 22 and inner left side track assembly 24 ride on lower portions 57E of the underlying terrain while the outer left side track assembly 26 and the inner right side track assembly 23 deflect upward to ride over separate small underlying mounds 58E.

The several reactions of the track assemblies and suspension system depicted in FIGS. 5 to 8 and discussed above involve terrain conditions in which there is an elevational difference in the surfaces underlying each of the two right side track assemblies 22 and 23 and in which there is also an elevational difference in the surfaces underlying each of the left side track assemblies 24 and 26. The system also maintains a high degree of ground contact area under conditions where there is an elevational difference or a difference of slope under the right side pair of tracks considered jointly as opposed to the left side pair of tracks considered jointly. These kinds of terrain irregularities are accommodated to primarily by the ability of each pair of track assemblies to swing outwardly and inwardly relative to the vehicle and to do so independently of the other pair of track assemblies. Typical instances of this form of accommodation to irregular terrain are illustrated in FIGS. 9 to 13.

Figure 9:
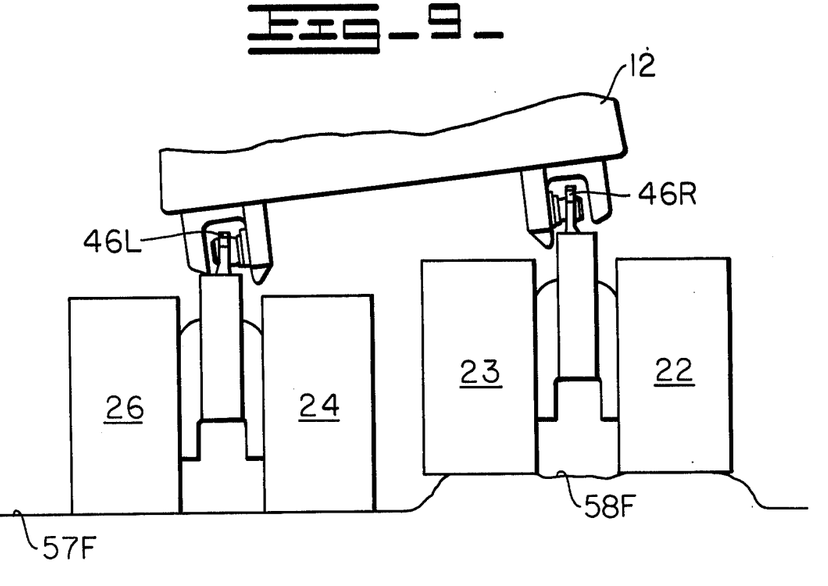
FIGS. 9 to 13 are rear views of the lower portion of the vehicle of the preceding figures further illustrating the response of the track and suspension mechanism to terrain of a variety of contours.

FIG. 9 is a back view of the lower portion of the vehicle under circumstances where the left side pair of track assemblies 24 and 26 are both riding on a flat, level surface 57F while both of the right pair of track assemblies 22 and 23 ride on an adjacent more elevated mound surface 58F. Under these conditions, pivoting movement in the lateral direction occurs about the trunnion bearings 46R and 46L to enable all four track assemblies to remain in contact with the underlying surface. Under these conditions, all four track assemblies remain in an upright position and the pivoting motion at trunnion bearings 46 causes a sideward tilting of the vehicle body 14.

Figure 10:
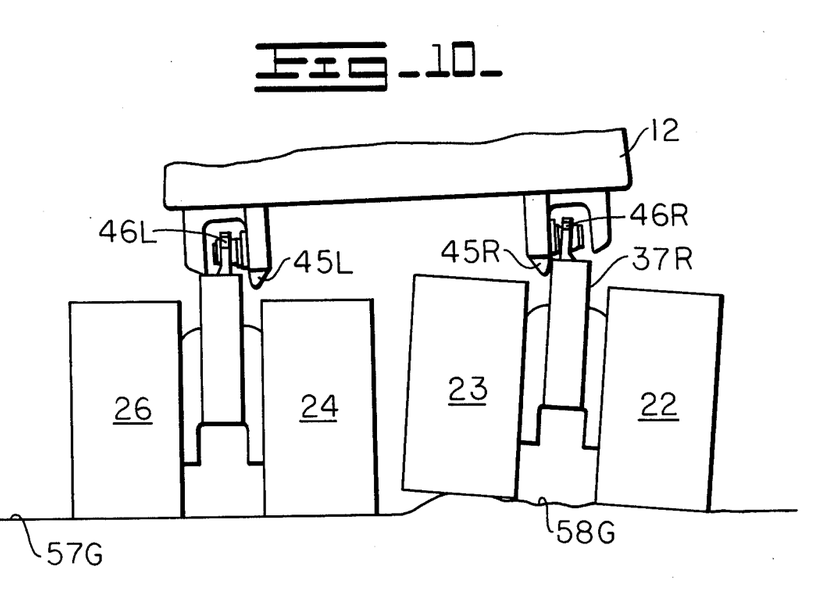

The system also maintains ground contact at all four track assemblies under conditions where one or both of the two pairs of track assemblies encounter an underlying surface which slopes in a direction transverse of the vehicle. FIG. 10 illustrates this action under circumstances where the left side pair of track assemblies 24 and 26 remain on a flat, level surface 57G while the right side pair of track assemblies 22 and 23 ride on an adjacent surface 58G which slopes in the transverse direction with the highest portion of the surface 58G being under the inner right track assembly 23. Under this circumstance the left side track assemblies 24 and 26 remain upright while the right side track assemblies 22 and 23 together with the right suspension frame member 37R jointly swing inwardly by pivoting motion about trunnion bearing 46R in order to maintain contact of both of the right side track assemblies with the underlying sloping surface.

Figure 11:
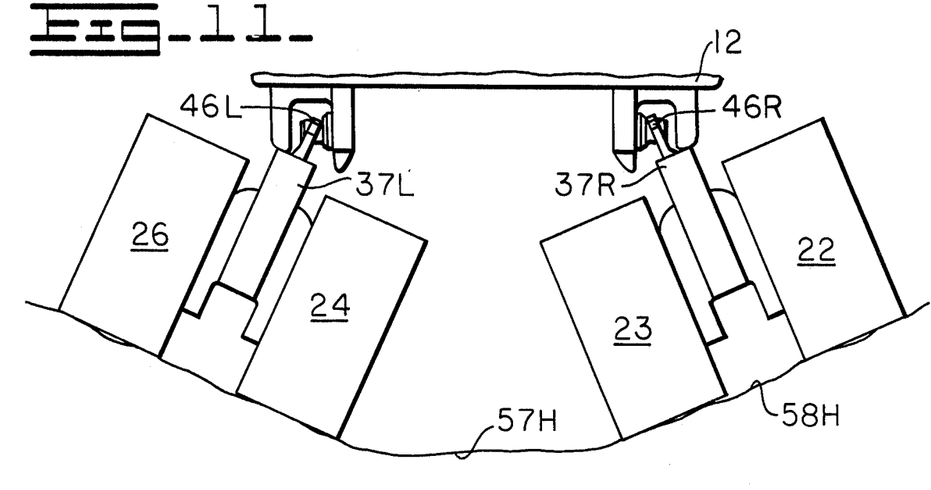

FIG. 11 illustrates the reaction of the system when the vehicle travels along a gully having a low area 57H directly beneath the center of the vehicle and having adjacent portions 58H which slope upwardly in opposite directions at opposite sides of the vehicle. Under this condition the right side track assemblies 22 and 23 together with right suspension frame member 37R swing outwardly as a unit about trunnion bearing 46R while the left side pair of track assemblies 24 and 26 and the left suspension frame member 37L swing outwardly towards the side of the vehicle in the opposite direction about trunnion bearing 46L.

Figure 12:
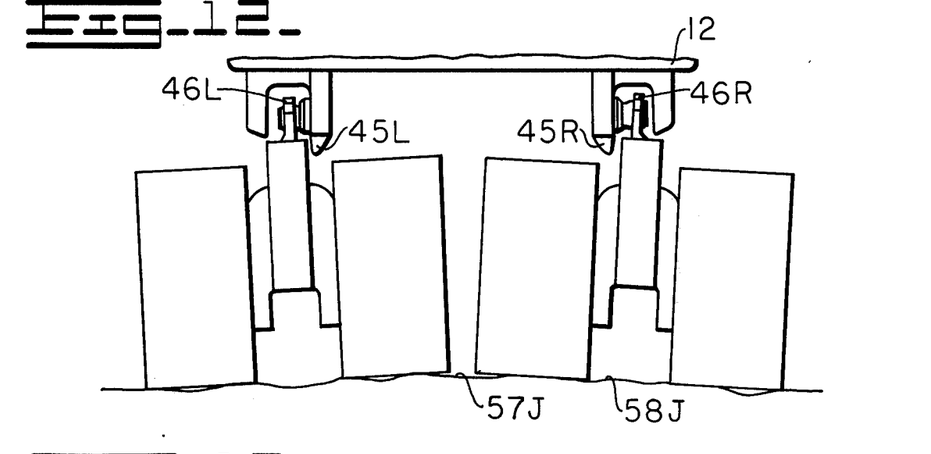

FIG. 12 illustrates the actions of the system under conditions opposite from those of the preceding figure. Under circumstances depicted in FIG. 12, the vehicle is traveling along a ridged surface having a high point 57J which slopes downward in opposite directions at each side of the vehicle. Under this condition, right side track assemblies 22 and 23 together with right suspension frame member 37R swing inwardly as a unit about trunnion bearing 46R while the left side pair of track assemblies 24 and 26 and left suspension frame member 37L swing inwardly in the opposite direction about trunnion 46L.

Figure 13:
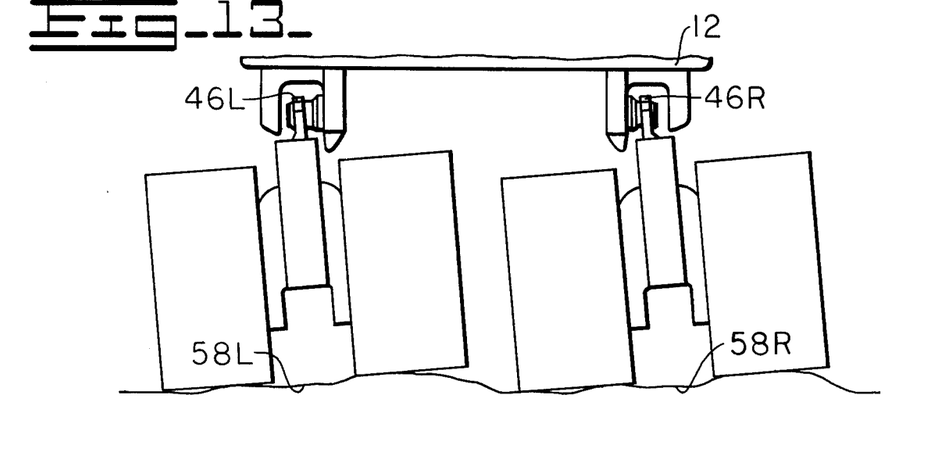

The accommodation to surfaces which slope in the transverse direction relative to the vehicle is not limited to the symmetrical terrain configurations depicted in FIGS. 11 and 12. FIG. 13 illustrates the reaction of the system where the surface 58R beneath the right side pair of track assemblies 22 and 23 and the surface 58L beneath the left side pair of track assemblies 24 and 26 both slope to one side in the same direction. Under that condition both pairs of track assemblies pivot laterally in the same direction about their respective trunnion bearings 46 as depicted in FIG. 13.

The several responses of the system to uneven terrain as depicted in FIGS. 5 to 8 have been shown and described as involving only pivoting movements of one or more of the track assemblies in a vertical direction or, in other words, oscillation of one or more of the track assemblies about an axis which is transverse to the vehicle. The additional responses of the system to uneven terrain as depicted in FIGS. 9 to 13 have been described as involving lateral swinging movement of pairs of the tracks about axes extending lengthwise of the vehicle. It should be understood that in practice these two types of reaction, that is, vertical oscillation of one or more track assemblies about a transverse axis and lateral swinging of pairs of the track assemblies inward and outward relative to the vehicle body, may occur simultaneously and in various combinations as determined by contour and elevational irregularities of the underlying terrain.

While the invention has been described with respect to a single exemplary embodiment, it will be apparent that many modifications are possible and it is not intended to limit the invention except as defined in the following claims.

The embodiments of the invention in which an exclusive property or privilege is claimed are defined as follows:

1. A crawler track vehicle comprising:
    a vehicle body,
    four spaced-apart crawler track assemblies disposed beneath said vehicle body and extending lengthwise with respect thereto, said crawler track assemblies including a right side outer track assembly, a right side inner track assembly, a left side outer track assembly and a left side inner track assembly, and
    a suspension system for supporting said vehicle body on said four track assemblies, said suspension system having means for coupling a forward portion of said vehicle body to a forward portion of each of said track assemblies and means for coupling relatively rearward portions of said vehicle body to a rearward portion of each of said track assemblies, said suspension system further having vertical oscillation means for enabling independent oscillation of the forward portion of each of said track assemblies about a transverse axis extending transversely with respect to said vehicle, and having lateral oscillation means for enabling joint oscillation of said outer and inner right side track assemblies about a right longitudinal axis extending lengthwise with respect to the right side of said vehicle and for enabling joint oscillation of said left side outer and inner track assemblies about a left longitudinal axis extending lengthwise with respect to the left side of said vehicle and which is spaced apart from said right longitudinal axis, said joint oscillation of said outer and inner right side track assemblies being independent of said joint oscillation of said outer and inner left side track assemblies.

2. The combination of claim 1 wherein said lateral oscillation means comprises a right side trunnion bearing jointly coupling the rearward portions of said right side outer track assembly and said right side inner track assembly to said vehicle body, and a left side trunnion bearing jointly coupling the rearward portions of said left side outer track assembly and said left side inner track assembly to said vehicle body said trunnion bearings being of the form capable of pivoting movement in at least two orthogonal directions.

3. A crawler track vehicle comprising:
a vehicle body,
four spaced-apart crawler track assemblies disposed beneath said vehicle body and extending lengthwise with respect thereto, said crawler track assemblies including a right side outer track assembly, a right side inner track assembly, a left side outer track assembly and a left side inner track assembly, and
a suspension system for supporting said vehicle body on said four track assemblies, said suspension system having vertical oscillation means enabling independent oscillation of the forward portion of each of said track assemblies about a transverse axis extending transversely with respect to said vehicle, and having lateral oscillation means enabling joint oscillation of said outer and inner right side track assemblies about a right longitudinal axis extending lengthwise with respect to the right side of said vehicle and enabling joint oscillation of said left side outer and inner track assemblies about a left longitudinal axis extending lengthwise with respect to the left side of said vehicle, wherein said suspension system further comprises:
a right side secondary doubletree member extending transversely relative to said vehicle between said right side outer track assembly and said right side inner track assembly and being pivotably coupled to each thereof,
a left side secondary doubletree member extending transversely relative to said vehicle between said left side outer track assembly and said left side inner track assembly and being pivotably coupled to each thereof,
a primary doubletree member extending transversely with respect to said vehicle from the central region of said right side secondary doubletree member to the central region of said left side secondary doubletree member, the central region of said primary doubletree member being pivotably coupled to said vehicle body at a point substantially midway between the sides of said vehicle, the right end of said primary doubletree member being pivotably coupled to said central region of said right side secondary doubletree member and the left end of said primary doubletree member being pivotably coupled to said central region of said left side secondary doubletree member.

4. The combination of claim 3 further comprising a main frame supporting said vehicle body and wherein said central region of said primary doubletree member is pivotably coupled to said vehicle body by a pivot connection to said main frame.

5. A crawler track vehicle comprising:
a vehicle body,
four spaced-apart crawler track assemblies disposed beneath said vehicle body and extending lengthwise with respect thereto, said crawler track assemblies including a right side outer track assembly, a right side inner track assembly, a left side outer track assembly and a left side inner track assembly, and
a suspension system for supporting said vehicle body on said four track assemblies, said suspension system having vertical oscillation means enabling independent oscillation of the forward portion of each of said track assemblies about a transverse axis extending transversely with respect to said vehicle, and having lateral oscillation means enabling joint oscillation of said outer and inner right side track assemblies about a right longitudinal axis extending lengthwise with respect to the right side of said vehicle and enabling joint oscillation of said left side outer and inner track assemblies about a left longitudinal axis extending lenghtwise with respect to the left side of said vehicle, wherein said suspension system including said vertical oscillation means and said lateral oscillation means comprises:
a right side suspension frame member extending lengthwise with respect to said vehicle between said right side outer track assembly and said right side inner track assembly and a left side suspension frame member extending lengthwise with respect to said vehicle between said left side outer track assembly and said left side inner track assembly,
right side coupling shaft means aligned with said transverse axis and coupling said right side outer track assembly and said right side inner track assembly to said right side suspension frame member while enabling independent vertical oscillation of the forward portions of each of said right side track assemblies about said transverse axis,
left side coupling shaft means aligned with said transverse axis and coupling said left side outer track assembly and said left side inner track assembly to said left side suspension frame member while enabling independent vertical oscillation of the forward portions of each of said left side track assemblies about said transverse axis,
a right side trunnion bearing coupling said right side suspension frame member to said vehicle body and a left side trunnion bearing coupling said left side suspension frame member to said vehicle body,
a primary doubletree member extending transversely with respect to said vehicle body and being pivotably coupled thereto at a point midway between the sides of said vehicle, the right end of said primary doubletree member being pivotably coupled to said right suspension frame member and the left end of said primary doubletree member being pivotably coupled to said left suspension frame member,
a right side secondary doubletree member extending transversely between said right side outer track assembly and said right side inner track assembly and having opposite ends pivotably coupled to each thereof and having a central region pivotably coupled to said right side suspension frame member, and
a left side secondary doubletree member extending transversely between said left side outer track assembly and said left side inner track assembly and having opposite ends pivotably coupled to each thereof and having a central region pivotably coupled to said left side suspension frame member.

6. The combination defined in claim 5 wherein said right side coupling shaft means and said left side coupling shaft means are coupled to said track assemblies to said right and left side suspension frame members at a location between the midpoint and back ends of said track assemblies and wherein said right and left side trunnion bearings are situated rearwardly from said location and wherein said doubletree members are situated forwardly from said location.

7. The combination defined in claim 5 further comprising a rectangular main frame supporting said vehicle body and wherein said right side and said left side trunnion bearings and said primary doubletree member couple said track assemblies to said vehicle body through said main frame.

8. The combination defined in claim 7 further comprising stop means secured to said main frame adjacent said right side and said left side trunnion bearings for limiting lateral oscillation of said track assemblies.

9. The combination defined in claim 5 wherein said primary doubletree member and said secondary doubletree members are pivotably coupled to said suspension frame members at the forward ends thereof.

10. The combination of claim 5 wherein each of said track assemblies includes a drive sprocket at the back end engaging an endless track chain thereof, further comprising a right side drive motor means mounted on said right side suspension frame member for driving said sprockets of said outer and inner right side track assemblies, and a left side drive motor means mounted on said left side suspension frame member for driving said sprockets of said outer and inner left side track assemblies.

11. The combination defined in claim 10 wherein said right side and left side coupling shaft means and said transverse axis are situated between the midpoints and back ends of said track assemblies.

12. The combination of claim 10 wherein said right side drive motor and said left side drive motor are fluid operated motors.

* * * * *